Figure 1:
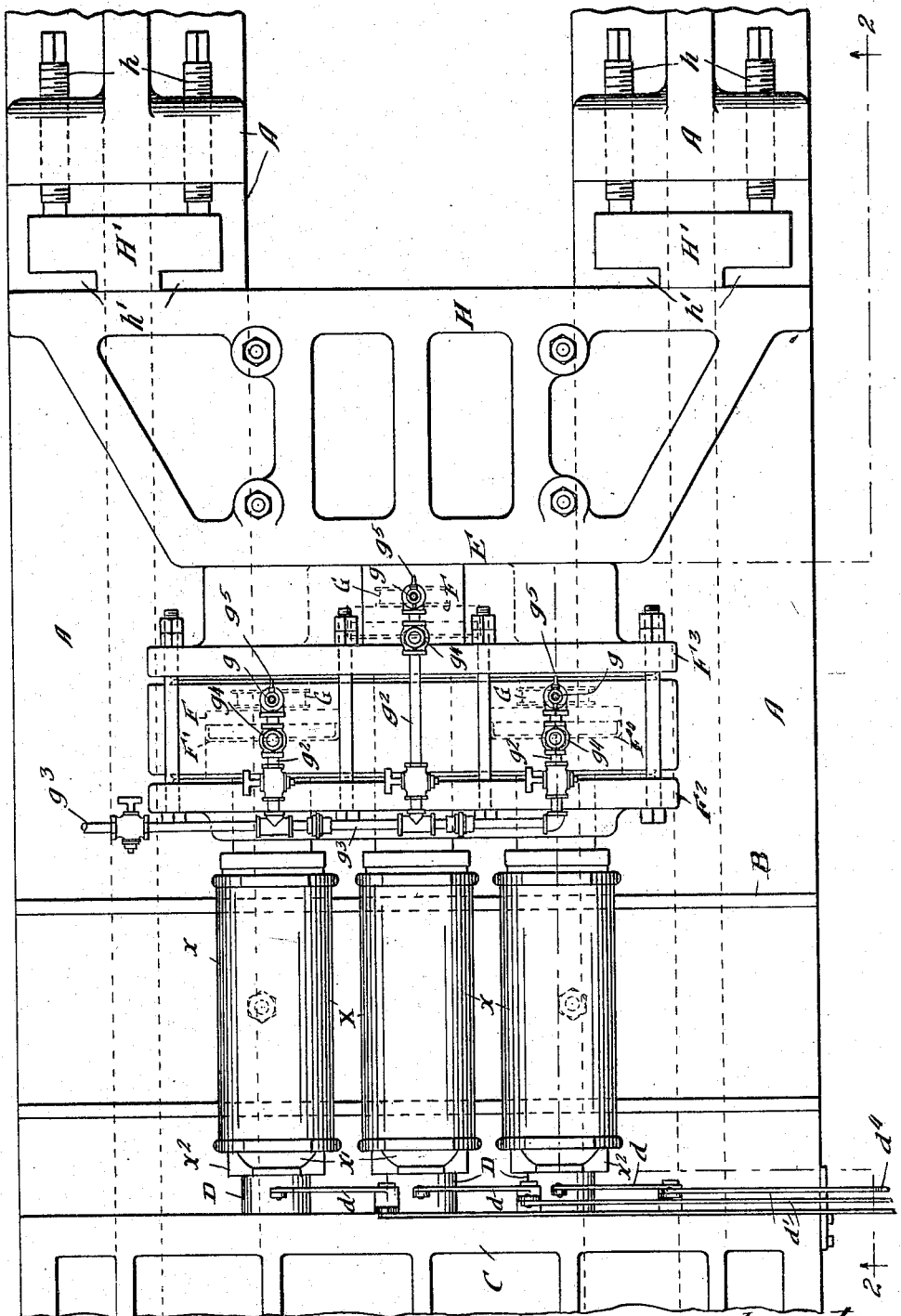

J. F. O'CONNOR.
FRICTION DRAFT RIGGING FINISHING AND PROVING MACHINE.
APPLICATION FILED MAR. 22, 1909.

932,566.

Patented Aug. 31, 1909.
2 SHEETS—SHEET 1.

Witnesses:
Wm. Geiger
H. W. Munday

Inventor
John F. O'Connor
By Munday, Evarts, Adcock & Clarke.
Attorneys

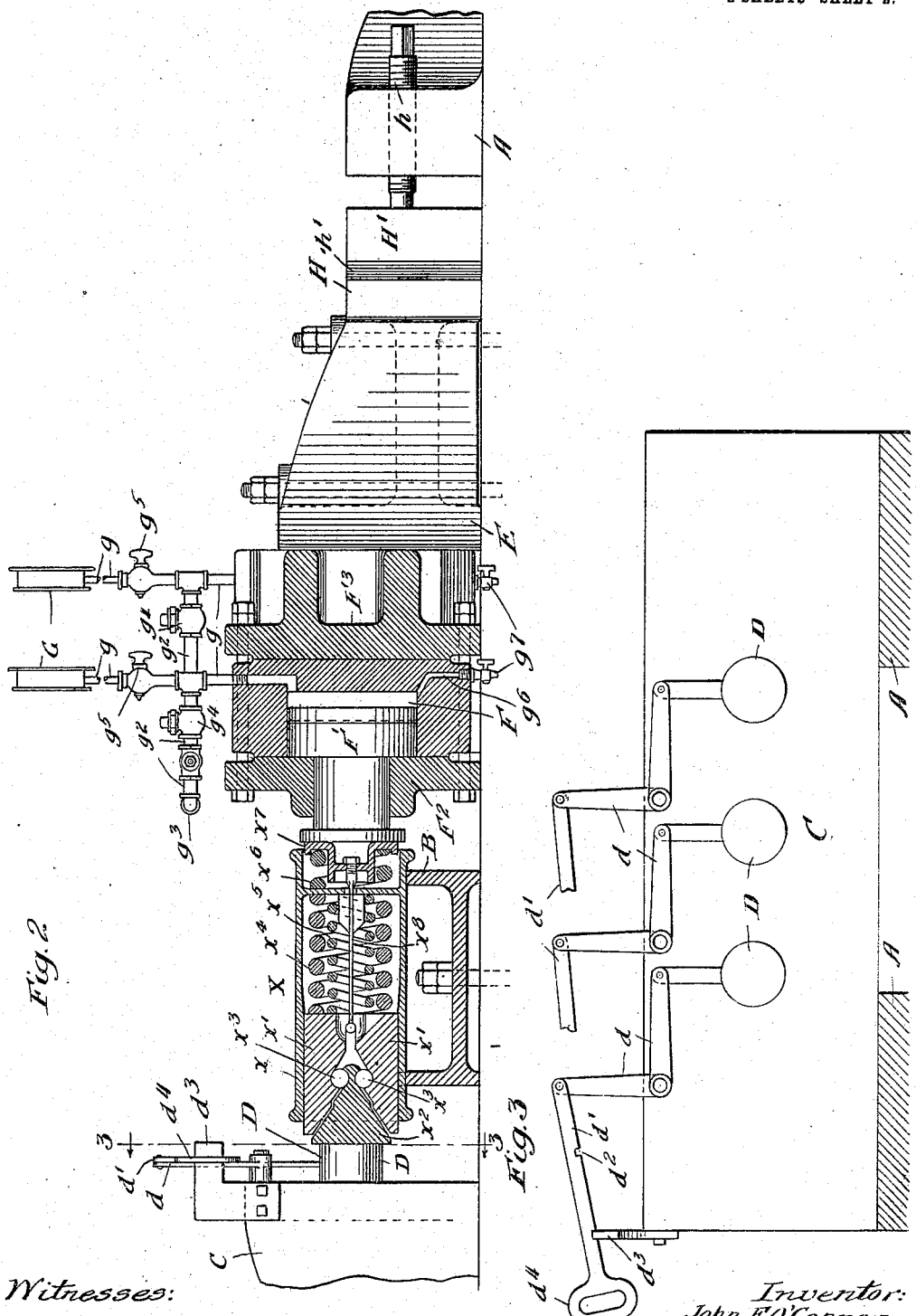

UNITED STATES PATENT OFFICE.

JOHN F. O'CONNOR, OF CHICAGO, ILLINOIS, ASSIGNOR TO W. H. MINER COMPANY, OF CHICAGO, ILLINOIS, A CORPORATION OF ILLINOIS.

FRICTION-DRAFT-RIGGING FINISHING AND PROVING MACHINE.

932,566.   Specification of Letters Patent.   Patented Aug. 31, 1909.

Application filed March 22, 1909. Serial No. 485,094.

*To all whom it may concern:*

Be it known that I, JOHN F. O'CONNOR, a citizen of the United States, residing in Chicago, in the county of Cook and State of Illinois, have invented a new and useful Improvement in Friction-Draft-Rigging Finishing and Proving Machines, of which the following is a specification.

My invention relates to improvements in machines for finishing and testing or proving friction draft rigging for railway cars.

In the practical manufacture of friction draft rigging of the kind wherein the friction members consist of a plurality of friction shoes and a friction case or cylinder with the interior periphery of which the friction shoes are in sliding frictional engagement, and wherein a wedge is employed with anti-friction rollers on each face thereof to force the friction shoes into engagement with the friction case or cylinder, defective or inadequate cushioning or releasing action is sometimes liable to result from unavoidable irregularities in the shape or surfaces of the cast metal parts, and especially of the friction shoes and friction case, and although such defective or inadequate operation of the friction devices will ordinarily very quickly disappear after the draft rigging is put into practical use by smoothing down irregularities of surface by wear, it is obviously of great importance that the operation of each and every friction draft rigging should be perfect and reliable from the start or as soon as it is put upon a car for practical use.

The object of my invention is to provide a machine of a simple, efficient and durable construction by means of which friction draft rigging may be rapidly, quickly and cheaply finished, and tested or proved efficient and reliable for practical use.

My invention consists in the means I have devised and employ as herein shown and described for practically accomplishing this object or result, the same being more particularly set forth in the claims.

In the accompanying drawing forming a part of this specification, Figure 1 is a plan view of a machine embodying my invention. Fig. 2 is a central, vertical section on line 2—2 of Fig. 1. Fig. 3 is a detail end elevation, partly in section, looking from the line 3—3 of Fig. 2.

In the drawing, A represents the frame or bed of the machine, B a track or way along which the friction draft rigging cylinders may be rolled, C a reciprocating cross-head (operated by a steam or other engine through suitable eccentrics or other connecting means not shown,) D movable blocks adapted to be interposed between the cross-head C and the wedges of a plurality of friction draft riggings on the track B, E a fixed abutment for opposing the thrust of the cross-head C, F a plurality of hydraulic pressure gage cylinders or chambers, $F^1$ a plurality of pistons for said chambers, one opposite each movable block D, and G a plurality of hydraulic pressure gages, one connected with each of said pressure gage cylinders F.

The friction draft rigging X to be finished and tested by operation of the machine may be of any suitable kind or construction. As illustrated in the drawing, it comprises a friction case or cylinder $x$, friction shoes $x^1$, a wedge $x^2$, anti-friction rollers $x^3$, springs $x^4$ $x^5$ $x^6$, cap $x^7$ and connecting rod $x^8$.

The friction draft riggings X X are rolled along the track B into position between the movable blocks D and the pistons $F^1$ of the hydraulic pressure cylinders F, and then by operation of the reciprocating cross-head C, the friction shoes $x^1$ are forced repeatedly within the friction shell $x$ and released or restored to position after each stroke by the springs $x^4$ $x^5$, and the cushioning power and operation of each friction draft rigging at each stroke of the cross-head is indicated by the pressure gages G, the cushioning power of each draft rigging ordinarily increasing at each successive stroke of the cross-head until the normal cushioning power of each draft rigging is attained, after which further strokes of the cross-head do not materially change one way or the other the cushioning power of the draft rigging. Ordinarily a few strokes of the cross-head, six or eight, will be sufficient to cause the draft rigging to reach its normal cushioning power. As soon as any one draft rigging indicates by the pressure gage connected therewith a sufficient and proper operation and normal cushioning power, the movable block D in front of such draft rigging is raised or otherwise moved out of registration with the wedge $x^2$ of such draft rigging, so that further strokes of the cross-head C will only operate the other draft rigging on the track B. The movable block D is preferably thus moved and held out of position for operation by means of a bent lever $d$ and connecting link $d^1$, having notch $d^2$ adapted to engage the holding bar $d^3$. The link $d^1$ is furnished with a handle $d^4$.

To insure regularity and certainty of operation of the pressure gage G by the hydraulic pressure gage cylinder F and piston $F^1$, the cylinder F is kept normally filled with water or other liquid under pressure, this being preferably done by providing the pipe $g$ which connects the hydraulic cylinder F with the hydraulic pressure gage G with a connection $g^2$ communicating with the water service supply pipe $g^3$, a check valve $g^4$ in said pipe $g^2$ serving to prevent any back flow of water from the hydraulic cylinder when the same is under pressure from the cross head C. The head or pressure of water in the water service supply pipe $g^3$ thus insures the hydraulic cylinder F being always snugly and normally full of water whenever pressure is exerted upon its piston $F^1$ by the reciprocating cross-head C.

The pipes $g$ leading from the hydraulic pressure gage cylinders F to the pressure gages G are each furnished with valves $g^5$, and each of the hydraulic cylinders F is also provided with a drain or discharge passage $g^6$ closed by a valve $g^7$.

The fixed abutment E is suitably anchored to the frame or bed A, and an adjustable support H is preferably interposed between this fixed abutment and the hydraulic cylinders F, said adjustable support being adjusted as required by adjusting screws $h$. Safety breaker blocks $H^1$, preferably of cast iron or other like material are also preferably interposed between the pressure gage cylinders F and the fixed abutment E, the safety breaker blocks being preferably furnished with diminished necks $h^1$, and being preferably interposed directly between the adjusting screws $h$ and the adjustable support H.

The hydraulic cylinders F are preferably all rigidly connected together by the front and back plates $F^2$ $F^3$ thereof. Any desired number of hydraulic cylinders F and movable blocks D may be employed, three being shown in the drawing, this being the number I prefer to use, as it enables three draft riggings to be simultaneously finished and proved out or tested, and thus enables the work to be done rapidly and cheaply without requiring an engine of too enormous power for operating the cross-head C, it being understood that each of the friction draft riggings is frequently required to be of a construction capable of producing a cushioning resistance of two hundred thousand or three hundred thousand pounds.

In practical operation of the machine, when it is found that any particular draft rigging does not properly operate, or after a few strokes, does not properly develop its full or normal cushioning power, such defective draft rigging is removed and its defective condition of parts corrected.

I claim:—

1. In a friction draft rigging finishing and proving machine, the combination with a track for supporting a plurality of friction draft riggings, of a reciprocating cross-head, a plurality of movable blocks adapted to be interposed between the cross-head and the ends of the friction draft rigging on said track, a plurality of hydraulic pressure gage cylinders and pistons in line with said blocks and a plurality of pressure gages connected with said cylinders, substantially as specified.

2. In a friction draft rigging finishing and proving machine, the combination with a track for supporting a plurality of friction draft riggings, of a reciprocating cross-head, a plurality of movable blocks adapted to be interposed between the cross-head and the ends of the friction draft rigging on said track, a plurality of hydraulic pressure gage cylinders and pistons in line with said blocks and a plurality of pressure gages connected with said cylinders, each of said cylinders having a pipe provided with a check valve and communicating with the water service supply, substantially as specified.

3. The combination with a reciprocating cross head adapted to be quickly and repeatedly moved back and forth to compress the draft gear, of a track for friction draft gear, a plurality of pressure gage cylinders and pistons opposing said reciprocating cross-head and a plurality of pressure gages communicating with said cylinders, connecting pipes between said cylinders and pressure gages, and pipes provided with check valves and communicating with the water service supply to keep said cylinders normally filled with water, substantially as specified.

4. In a friction draft rigging finishing and proving machine, the combination with a track for supporting a plurality of friction draft riggings, of a reciprocating cross-head, a plurality of movable blocks adapted to be interposed between the cross-head and the ends of the friction draft rigging on said track, a plurality of hydraulic pressure gage cylinders and pistons and a plurality of pressure gages connected with said cylinders, a fixed abutment for said pressure gage cylinders and an interposed adjustable support, substantially as specified.

5. In a friction draft rigging finishing and proving machine, the combination with a track for supporting a plurality of friction draft riggings, of a reciprocating cross-head, a plurality of movable blocks adapted to be interposed between the cross-head and the ends of the friction draft rigging on said track, a plurality of hydraulic pressure gage cylinders and pistons and a plurality of pressure gages connected with said cylinders, a fixed abutment for said pressure gage cylinders, an interposed adjustable support and safety breaker blocks interposed between said fixed support and said hydraulic cylinders, substantially as specified.

6. In a friction draft rigging finishing and proving machine, the combination with a track for supporting a plurality of friction draft riggings, of a reciprocating cross-head, a plurality of movable blocks adapted to be interposed between the cross-head and the ends of the friction draft rigging on said track, a plurality of hydraulic pressure gage cylinders and pistons, and a plurality of pressure gages connected with said cylinders, a fixed abutment for said pressure gage cylinders, an interposed adjustable support and safety breaker blocks interposed between said fixed support and said hydraulic cylinders, said safety breaker blocks having contracted necks, substantially as specified.

7. In a friction draft rigging finishing and testing machine, the combination with a track, of a reciprocating cross head adapted to be quickly and repeatedly moved back and forth to compress the draft gear, a pressure gage and a hydraulic cylinder and piston, said track extending transversely between said cross head and the piston of said hydraulic cylinder and adapted to support the draft rigging in line therewith, substantially as specified.

8. In a friction draft rigging finishing and testing machine, the combination with a track, of a reciprocating cross head adapted to be quickly and repeatedly moved back and forth to compress the draft gear, a pressure gage and a hydraulic cylinder and piston, and a movable block adapted to be interposed between said cross-head and the wedge member of the friction draft rigging to be finished and tested and to be removed out of registry with said wedge when the testing and finishing operation is completed, substantially as specified.

9. In a friction draft rigging finishing and testing machine, the combination with a track, of a reciprocating cross head adapted to be quickly and repeatedly moved back and forth to compress the draft gear, a pressure gage and a hydraulic cylinder and piston, said track extending transversely between said cross head and the piston of said hydraulic cylinder and adapted to support the draft rigging in line therewith, a fixed abutment for said hydraulic cylinder and an adjustable support interposed between said hydraulic cylinder and said fixed abutment, substantially as specified.

10. In a friction draft rigging finishing and testing machine, the combination with a track, of a reciprocating cross head, a pressure gage and a hydraulic cylinder and piston, a fixed abutment for said hydraulic cylinder, an adjustable support interposed between said hydraulic cylinder and said fixed abutment, and a safety breaker block interposed between said fixed abutment and said hydraulic cylinder, substantially as specified.

11. In a friction draft rigging finishing and testing machine, the combination with a track, of a reciprocating cross head adapted to be quickly and repeatedly moved back and forth to compress the draft gear, a pressure gage, a hydraulic cylinder and piston, said track extending transversely between said cross head and the piston of said hydraulic cylinder and adapted to support the draft rigging in line therewith, a connecting pipe between said cylinder and pressure gage and a pipe provided with a check valve and communicating with a water supply under pressure to keep said cylinder normally filled, substantially as specified.

12. In a friction draft rigging finishing and testing machine, the combination with a track, of a reciprocating cross head, a pressure gage, a hydraulic cylinder and piston, a fixed abutment for said cylinder and a safety breaker block interposed between said fixed abutment and said cylinder, substantially as specified.

13. In a friction draft rigging finishing and testing machine, the combination with a track, of a reciprocating cross head adapted to be quickly and repeatedly moved back and forth to compress the draft gear, a pressure gage and a hydraulic cylinder and piston, said track extending transversely between said cross head and the piston of said hydraulic cylinder and adapted to support the draft rigging in line therewith, a movable block adapted to be interposed between said cross-head and the wedge of the friction draft rigging to be finished and tested, a fixed abutment for said cylinder, and an adjustable support interposed between said fixed abutment and said cylinder substantially as specified.

14. In a friction draft rigging finishing and testing machine, the combination with a track, of a reciprocating cross head, a pressure gage and a hydraulic cylinder and piston, a movable block adapted to be interposed between said cross-head and the wedge of the friction draft rigging to be finished and tested, a fixed abutment for said cylinder, an adjustable support interposed between said fixed abutment and said cylinder, and a safety breaker block between said cylinder and said abutment, substantially as specified.

JOHN F. O'CONNOR.

Witnesses:
EDMUND ADCOCK,
H. M. MUNDAY.